Patented May 21, 1929.

1,714,378

UNITED STATES PATENT OFFICE.

ANGELO KNORR, OF BERLIN, AND ALBERT WEISSENBORN, OF POTSDAM, GERMANY, ASSIGNORS, BY MESNE ASSIGNMENTS, TO WINTHROP CHEMICAL COMPANY, INC., OF NEW YORK, N. Y., A CORPORATION OF NEW YORK.

PROCESS OF PREPARING KETO-ALCOHOLS.

No Drawing. Application filed January 21, 1927, Serial No. 162,671, and in Germany January 19, 1926.

This invention relates to processes for the prepartion of keto-alcohols.

The condensation of aldehydes with ketones has been much investigated but no practical mode of carrying out the condensation has been found.

Condensation by means of aqueous alkalies, alkali carbonates or alkali cyanides, so far as any condensation is attainable, gives very poor yields.

Condensation by means of gaseous hydrochloric acid leads to compounds containing chlorine, the separation of which from the mass gives rise to difficulties.

The poor results which have been obtained in this particular condensation are due to the fact that the reaction between aldehydes and ketones proceeds only very gradually, whereas the aldehydes are very sensitive towards the condensing agents; thus the desired reaction is smothered by aldol condensation and resinification, and, besides, the ketols which are at first produced are not stable towards the usual condensing agents.

Special precautions, for example dissolving the aldehyde and ketone to be condensed in a solvent immiscible with water and using the condensing agent in aqueous solution, are tedious and irregular in effect, not always leading to the desired result in spite of the fact that in this manner the aldehyde and the ketol produced are withdrawn from the injurious action of the condensing agent.

By the present invention these difficulties are overcome by operating in the following manner:

The condensation is conducted in the absence of water and with the use of an alkali metal compound of a 1.3-ketol as the condensing agent. Advantageously, there is used as the alkali metal compound of the ketol, one which is produced by treating with an anhydrous solid alkali metal hydroxide in the cold the ketone which is to be condensed. To the solution of the condensing agent in excess of ketone,—for instance, to the solution of the alkali metal compound of diacetone-alcohol in acetone,—the aldehyde is added gradually while cooling well. The condensation proceeds rapidly and hardly any by-product is produced. For example, when acetone is used, almost the only by-product is diacetone-alcohol which may be used for making fresh condensing agent. The mixture produced by the reaction is easily worked up; the alkali is precipitated by means of carbon dioxide, the excess of ketone is separated by distillation and the condensation product is separated from the residue by fractional distillation, for instance, in a vacuum, the yield being good. The process is applicable for example to the following condensations:

Saturated aliphatic aldehydes + saturated aliphatic ketones.

Saturated aliphatic aldehydes + unsaturated aliphatic ketones.

Unsaturated aliphatic aldehydes + saturated aliphatic ketones.

Unsaturated aliphatic aldehydes + unsaturated aliphatic ketones.

Saturated aliphatic aldehydes + arylalkyl ketones.

Unsaturated aliphatic aldehydes + arylalkyl ketones.

Saturated aliphatic aldehydes + saturated aliphatic ring ketones.

Unsaturated aliphatic aldehydes + saturated aliphatic ring ketones.

Saturated aliphatic aldehydes + unsaturated aliphatic ring ketones.

Unsaturated aliphatic aldehydes + unsaturated aliphatic ring ketones.

Arylsubstituted saturated aldehydes + saturated ketones.

Arylsubstituted unsaturated aldehydes + saturated ketones.

Arylsubstituted saturated aldehydes + unsaturated ketones.

Arylsubstituted unsaturated aldehydes + unsaturated ketones.

Arylsubstituted saturated aldehydes + arylalkyl ketones.

Arylsubstituted unsaturated aldehydes + arylalkyl ketones.

Arylsubstituted saturated aldehydes + saturated aliphatic ring ketones.

Arylsubstituted unsaturated aldehydes + saturated aliphatic ring ketones.

Arylsubstituted saturated aldehydes + unsaturated aliphatic ring ketones.

Arylsubstituted unsaturated aldehydes + unsaturated aliphatic ring ketones.

The condensation products are useful as perfumes or as intermediate products in making perfumes.

The invention is illustrated by the following examples, the parts being by weight:

*Example 1.*—To 1000 parts of dry acetone there are added at 5° C. 20 parts of powdered potassium hydroxide; the potassium compound of diacetone-alcohol is produced and the solution becomes warm. It is cooled and there are dropped into it, while stirring and in the course of 3–6 hours, 300 parts of acetaldehyde. After the mixture has stood for ½ hour carbon dioxide is passed into it and the resulting solution is then drained from the precipitated potassium carbonate and the excess of acetone is separated by distillation. The distillation residue contains, besides diacetone-alcohol, hydracetylacetone in good yield, resinous by-products having been formed only in insignificant proportion.

*Example 2.*—To the well cooled solution of 10 parts of solid potassium hydroxide in 1000 parts of dry acetone there are added gradually, as prescribed in Example 1, 200 parts of propyl aldehyde, while stirring. The product is worked up as described in Example 1. There is obtained a good yield of hexanol-(4)-on-(2) which boils at 80–85° C. under 10 mm. pressure.

*Example 3.*—500 parts of methylethyl ketone are mixed with 10 parts of solid potassium hydroxide and brought into reaction in the cold, and gradually, with 200 parts of butyric aldehyde. The product is worked up as described in Example 1, whereby 300 parts of methylethyl ketone are recovered and there are obtained 280 parts of octanol-(5)-on-(3), which boils at 95–96° C. under 10 mm. pressure.

In similar manner crotylidene acetone is obtained by condensation of acetone and croton aldehyde to the corresponding ketol and gradually subsequently splitting off water; also, cinnamylidene acetone (boiling point 155° C. under 12 mm. pressure) from acetone and cinnamic aldehyde; also, ethylideneacetophenone (boiling point 120–125° C. under mm. pressure), from acetaldehyde and acetophenone; and ortho-ethylidene cyclohexanone from cyclohexanone and acetaldehyde.

Having now particularly described and ascertained the nature of our said invention and in what manner the same is to be performed, we declare that what we claim is:

1. The process of preparing keto-alcohols which consists in condensing an aldehyde with a ketone in the absence of water by means of an alkali metal compound of a 1.3-ketol as condensing agent.

2. The process which comprises dissolving in the cold a powdered alkali metal hydroxide in an excess of a ketone and causing an aldehyde to act in the cold upon this solution.

3. The process which comprises dissolving about 10 to 20 pounds of potassium hydroxide in about 1000 pounds of dry acetone and adding about 200 to 300 pounds of an aldehyde while cooling.

4. Process which comprises adding 20 parts by weight of powdered potassium hydroxide to 1000 parts by weight of dry acetone at about 5° C., cooling the resulting solution and slowly adding thereto in small portions at a time 300 parts by weight of acetaldehyde, thereafter passing into the reaction mixture carbon dioxide, separating the resulting solution from the resulting precipitate, and separating the excess of acetone from said solution by distillation.

In testimony whereof we affix our signatures.

Dr. ANGELO KNORR.
Dr. ALBERT WEISSENBORN.

---

CERTIFICATE OF CORRECTION.

Patent No. 1,714,378.

Granted May 21, 1929, to

ANGELO KNORR ET AL.

It is hereby certified that error appears in the printed specification of the above numbered patent requiring correction as follows: Page 2, line 43, after the word "under" insert the numeral "10"; and that the said Letters Patent should be read with this correction therein that the same may conform to the record of the case in the Patent Office.

Signed and sealed this 18th day of June, A. D. 1929.

(Seal)

M. J. Moore,
Acting Commissioner of Patents.

there are added at 5° C. 20 parts of powdered potassium hydroxide; the potassium compound of diacetone-alcohol is produced and the solution becomes warm. It is cooled and there are dropped into it, while stirring and in the course of 3–6 hours, 300 parts of acetaldehyde. After the mixture has stood for ½ hour carbon dioxide is passed into it and the resulting solution is then drained from the precipitated potassium carbonate and the excess of acetone is separated by distillation. The distillation residue contains, besides diacetone-alcohol, hydracetylacetone in good yield, resinous by-products having been formed only in insignificant proportion.

*Example 2.*—To the well cooled solution of 10 parts of solid potassium hydroxide in 1000 parts of dry acetone there are added gradually, as prescribed in Example 1, 200 parts of propyl aldehyde, while stirring. The product is worked up as described in Example 1. There is obtained a good yield of hexanol-(4)-on-(2) which boils at 80–85° C. under 10 mm. pressure.

*Example 3.*—500 parts of methylethyl ketone are mixed with 10 parts of solid potassium hydroxide and brought into reaction in the cold, and gradually, with 200 parts of butyric aldehyde. The product is worked up as described in Example 1, whereby 300 parts of methylethyl ketone are recovered and there are obtained 280 parts of octanol-(5)-on-(3), which boils at 95–96° C. under 10 mm. pressure.

In similar manner crotylidene acetone is obtained by condensation of acetone and croton aldehyde to the corresponding ketol and gradually subsequently splitting off water; also, cinnamylidene acetone (boiling point 155° C. under 12 mm. pressure) from acetone and cinnamic aldehyde; also, ethylideneacetophenone (boiling point 120–125° C. under mm. pressure), from acetaldehyde and acetophenone; and ortho-ethylidene cyclohexanone from cyclohexanone and acetaldehyde.

Having now particularly described and ascertained the nature of our said invention and in what manner the same is to be performed, we declare that what we claim is:

1. The process of preparing keto-alcohols which consists in condensing an aldehyde with a ketone in the absence of water by means of an alkali metal compound of a 1.3-ketol as condensing agent.

2. The process which comprises dissolving in the cold a powdered alkali metal hydroxide in an excess of a ketone and causing an aldehyde to act in the cold upon this solution.

3. The process which comprises dissolving about 10 to 20 pounds of potassium hydroxide in about 1000 pounds of dry acetone and adding about 200 to 300 pounds of an aldehyde while cooling.

4. Process which comprises adding 20 parts by weight of powdered potassium hydroxide to 1000 parts by weight of dry acetone at about 5° C., cooling the resulting solution and slowly adding thereto in small portions at a time 300 parts by weight of acetaldehyde, thereafter passing into the reaction mixture carbon dioxide, separating the resulting solution from the resulting precipitate, and separating the excess of acetone from said solution by distillation.

In testimony whereof we affix our signatures.

Dr. ANGELO KNORR.
Dr. ALBERT WEISSENBORN.

---

CERTIFICATE OF CORRECTION.

Patent No. 1,714,378.

Granted May 21, 1929, to

ANGELO KNORR ET AL.

It is hereby certified that error appears in the printed specification of the above numbered patent requiring correction as follows: Page 2, line 43, after the word "under" insert the numeral "10"; and that the said Letters Patent should be read with this correction therein that the same may conform to the record of the case in the Patent Office.

Signed and sealed this 18th day of June, A. D. 1929.

(Seal)

M. J. Moore,
Acting Commissioner of Patents.